United States Patent [19]
Alagy et al.

[11] Patent Number: 5,236,663
[45] Date of Patent: Aug. 17, 1993

[54] REACTION-DISTILLATION APPARATUS AND ITS USE

[75] Inventors: Jacques Alagy, Charbonnieres; Alain Forestiere, Vernaison; Jean-François Le Page, Rueil Malmaison; Marie Claire Marion, Villeurbanne; Jean-Charles Viltard, Marly Le Roi, all of France

[73] Assignee: Institut Francais Du Petrole, Rueil Malmaison, France

[21] Appl. No.: 848,584

[22] Filed: Mar. 9, 1992

[30] Foreign Application Priority Data

Mar. 8, 1991 [FR] France ................. 91 02938
Apr. 12, 1991 [FR] France ................. 91 04611

[51] Int. Cl.⁵ ............................................... B01J 35/02
[52] U.S. Cl. ................................. 422/211; 422/141; 422/142; 422/143; 261/94; 203/DIG. 6; 202/158
[58] Field of Search ............... 422/141, 142, 211, 143; 202/158; 203/DIG. 6, 28, 29; 261/94; 428/116

[56] References Cited

U.S. PATENT DOCUMENTS

| | | | |
|---|---|---|---|
| 3,528,783 | 7/1970 | Haselden | 422/211 |
| 3,595,626 | 7/1971 | Sowards | 261/94 |
| 4,133,645 | 1/1979 | Scott | 422/211 |
| 4,232,177 | 11/1980 | Smith, Jr. | 203/DIG. 6 |
| 4,425,288 | 1/1984 | Shimoi et al. | 202/158 |
| 4,439,350 | 3/1984 | Jones, Jr. | 203/DIG. 6 |
| 4,744,928 | 5/1988 | Meier | 428/116 |
| 4,847,430 | 11/1989 | Quany et al. | 203/DIG. 6 |
| 4,917,935 | 4/1990 | Kubick | 428/178 |

OTHER PUBLICATIONS

European Patent Application 0 488 884, published Oct. 2, 1991.

*Primary Examiner*—Robert J. Warden
*Assistant Examiner*—Hien Tran
*Attorney, Agent, or Firm*—Millen, White, Zelano & Branigan

[57] ABSTRACT

A reaction-distillation apparatus is provided comprising at least one reaction-distillation zone including at least one bed of solid elements disposed on a fluid-permeable perforated support having perforations small enough to retain the elements wherein the bed of solid elements includes loose solid catalytic particles and at least one receptacle, containing at least one distillation packing body, the external jacket of which is permeable to fluids and the impermeable to the solid catalytic particles and packing body. The apparatus can be used for carrying out chemical reaction and concomitant fractionation of the reaction mixture, for example, to synthesize ethers from olefins and alcohols.

9 Claims, 1 Drawing Sheet

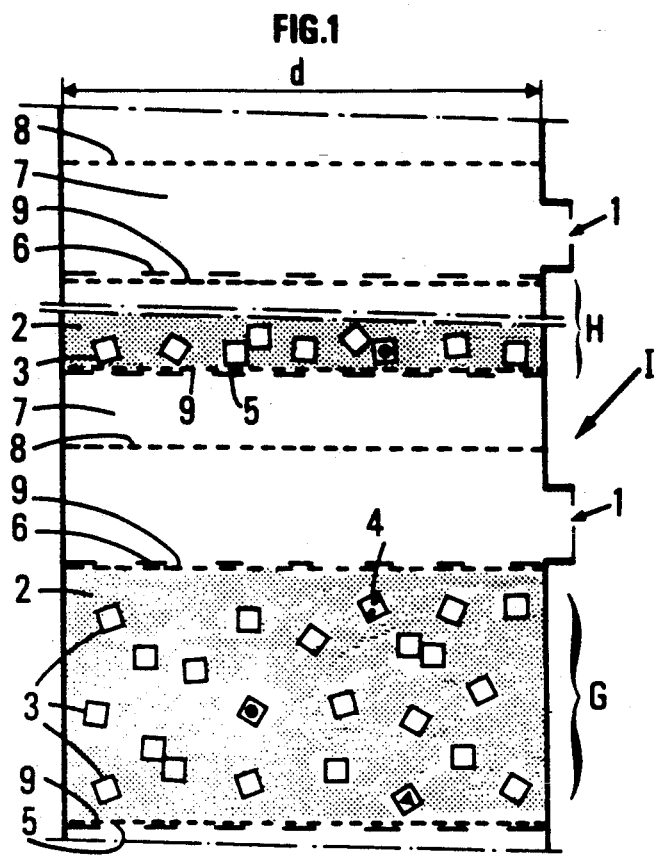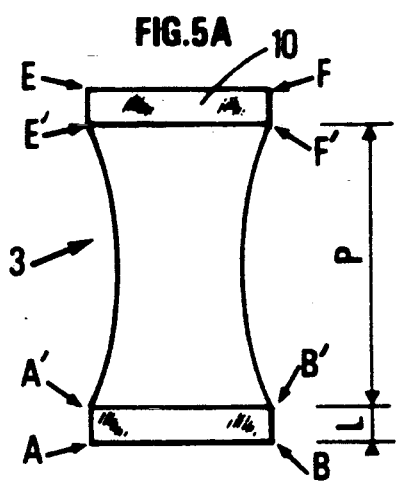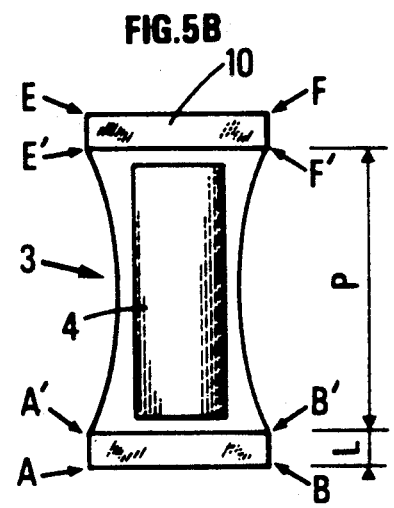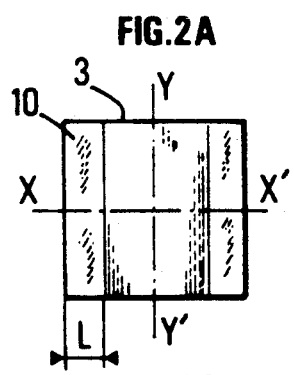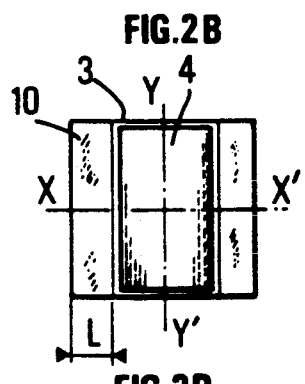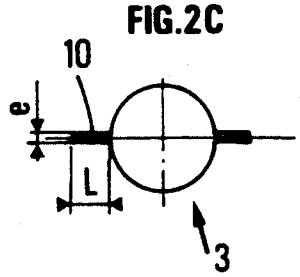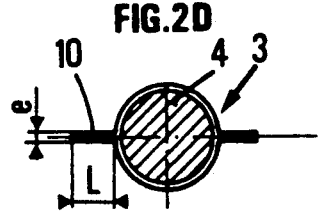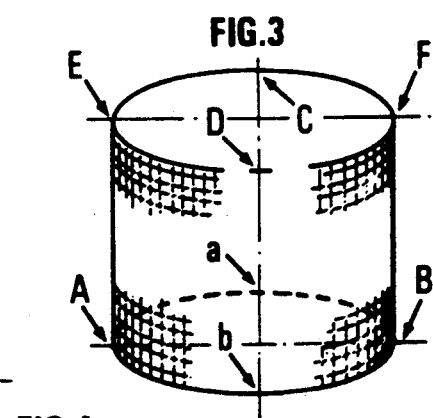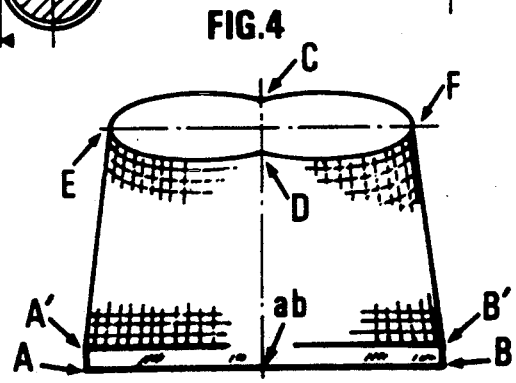

REACTION-DISTILLATION APPARATUS AND ITS USE

BACKGROUND OF THE INVENTION

The invention relates to a reaction-distillation apparatus and its use for carrying out a chemical reaction and fractionating the reaction mixture.

It also relates to a method of preparing an ether by reacting olefins with alcohols, wherein the reaction and distillation of the products formed, particularly with a view to separating them from non-reacted constituents, are carried out concurrently.

It has long been known that in the case of a balanced reaction, conversion of the reagents is limited by the thermodynamics. If an excess quantity of one of the reagents is introduced, conversion of the other reagents is increased. But this method is often costly, since it requires an additional installation to recover the reagent which was introduced in excess.

An effective way of obtaining total conversion beyond the thermodynamic equilibrium is to apply the so-called reactive distillation method. This comprises carrying in the same chamber the reaction, normally in the presence of a catalyst, and distillation, to separate the products from the other constituents as they are formed. This method is used, for example, for etherification reactions (U.S. Pat. No. 3,629,478, U.S. Pat. No. 4,847,430; and EP-B-8860).

U.S. Pat. No. 3,629,478 proposes that distillation plates be down comen passages from those plates to avoid the disruptive effective of the vapor phase through the catalyst. However, the presence of the catalyst in those passages creates a pressure drop, such that the liquid tends to descend countercurrently into the ports provided for the vapor to pass onto the work table of each distillation plate. Thus, in this construction a large part of the liquid does not come into contact with the catalyst; this limits the effectiveness of the reaction-distillation apparatus as far as the reaction is concerned.

U.S. Pat. No. 4,847,430 describes the use of reaction-distillation zones where the catalytic bed alternates with the distillation zone. Passages through the catalytic bed which are reserved for the vapor phase avoid gas/liquid contact and limit the problem of pressure loss. On the other hand, physical liquid/vapor equilibrium is not established permanently. Hence, one of the reagents in the catalytic zone may be exhausted, with a consequent loss of effectiveness in the reaction, particularly since the reactive column operates under conditions close to chemical equilibrium.

EP-B-8860 proposes the use of a distillation column filled with a catalyst appropriate for the preparation of methyl tertiobutyl ether (MTBE), wherein the catalyst, according to the form which it takes, also at least partly fulfills the function of a packing for distillation, this forming the MTBE and, at the same time, separating it from the other constituents present. However, the overall structure of the packing containing the catalyst and its vertical piling-up in the column are unfavorable to gas/liquid contact and do not produce effective distillation. Furthermore, this type of column filling is expensive, since it includes the cost of the catalyst, the cost of making the catalytic packing, and the cost of the metal netting wound around the catalytic mat. Moreover, when the catalyst has to be changed, the metal netting must also be changed, considerably increasing the cost of the operation.

SUMMARY OF THE INVENTION

The invention aims to avoid the disadvantages of prior art methods and apparatus. It proposes an apparatus which enables a reaction, balanced beyond the thermodynamic equilibrium, to be carried out in an apparatus with a reaction-distillation zone, enabling both a very effective reaction and very effective distillation.

To this end, the subject of the invention is a reaction-distillation apparatus comprising:

at least one reaction-distillation zone comprising at least one bed of solid elements disposed on a fluid-permeable, perforated support having perforations small enough to retain said solid elements, wherein the bed of solid elements comprises loose solid catalytic particles and at least one receptacle containing at least one packing body for distillation, the external jacket of which is permeable to fluids and impermeable to said solid catalytic particles and said packing body, the receptacle having mechanical properties which are adequate to withstand the load of loose catalyst without excessive deformation.

In this specification the term "perforated support" refers both to (1) a fluid permeable plate with adequate mechanical properties to support the weight of the bed of solid elements having perforations small enough to retain the solid elements, and (2) a unit comprising a fluid-permeable plate and a screen, the plate having perforations small enough to retain all the solid elements, and the screen having a mesh small enough to retain the solid elements.

The combination of the screen and plate has adequate mechanical properties to support the weight of the bed of solid elements. The screen and plate are made of materials which are inert vis-à-vis the various fluids and solid elements with which these materials come into contact.

In this specification, the term "reaction-distillation apparatus" refers to a piece of equipment in which a chemical reaction and (normally multi-stage) fractionation can be carried out simultaneously, and the term "reaction-distillation zone" refers to the zone in which the traction and the fractionation take place concomitantly.

In the reaction-distillation apparatus of the invention, random piling up (i.e., the piling up in bulk) of both the catalyst (which is disposed freely) and the receptacle or receptacles causes permanent disruption of the liquid and gas flows so as to optimize gas/liquid contact and liquid-solid (particularly catalyst) contact. Physical liquid-gas equilibrium is permanently maintained, and there is optimal irrigation of the catalyst. In the reaction-distillation zone, the reaction and distillation functions are concomitant, thus permitting maximum effectiveness of the reaction column.

In this specification, the expression "without excessive deformation" signifies that the mechanical properties of the receptacle are such that whatever its position in the bed of solid elements, the receptacle will still be able to carry out its specific functions, and particularly to ensure that there is a (non-zero) volume empty of any solid, thereby making it possible to obtain a given amount of empty space relative to each receptacle and, consequently, a given amount of empty space in the reaction-distillation zone.

In other words, if V is the empty volume of the receptacle after its manufacture, the empty volume of the receptacle within the bed of solid elements will be less than or equal to V but cannot be zero. It is preferable to use receptacles produced so that the volume V1 is very close to V, and usually so that they do not suffer any deformation under the weight of the load of catalyst. In this preferred embodiment, V1 is thus from about 80 to 100% and most frequently from about 90 to 100% of the value V.

The applications of the apparatus according to the invention are very varied. It may easily be adapted to the requirements inherent in the application. Thus, the heterogeneous-type catalyst is selected according the reaction concerned.

In a preferred embodiment of the invention, the bed of solid elements will have a plurality (that is, two or more) of receptacles. In a special form of this preferred embodiment a limited number of receptacles, often from 1 to 100% and preferably from 1 to 90% of the receptacles present in the bed of solid elements, may contain at least one distillation packing body. In this special form, there will thus be at least one empty receptacle in the bed of solid elements.

For receptacles containing at least one packing body, the type of distillation packing body is selected according to the effectiveness of the distillation function required.

In this specification, "distillation packing body" refers to any packing body which is well known in the art, such as solids in the form of rings, polylobe extrusions or saddle shaped pieces. Some non-restrictive examples of special packing bodies which may be used in the invention are Raschig, Pall or Intos rings and Berl, Novalox or Intalox saddles. It is also possible to use geometrically regular packing bodies, such as those developed as long as 25 years ago by SULZER or those described in U.S. Pat. No. 3,679,537, EP-B-70917, EP-A-212202, FR-A-2637059 and FR-A-2637060. Multiknit's coiled, knitted pads or even pieces of netting are also proposed as packing bodies. For a description of these distillation packing bodies, one may also consult the new English edition of Ullmann's Encyclopedia of Industrial Chemistry, Volume B3, Unit Operation II, Chapter 4, "Distillation and Rectification," particularly pages 70 to 92.

In a preferred embodiment of the invention, the bed of solid elements comprises a plurality (that is, two or more) of receptacles, each of which may contain one or more packing bodies. The various receptacles may be identical to or different from one another, for example, in size, shape or the material of which they are made. Each "no-empty" receptacle may contain one or more packing bodies, and the bodies may be identical to or different from one another, for example, in size, shape or the material of which they are made. The various empty or "non-empty" receptacles may be identical to or different from one another, for example, in size, shape or the material of which they are made. Most frequently, the bed of solid elements will have a plurality of identical receptacles. The specification implicitly includes cases where the packing body forms a unit with the receptacle, that is, cases where said body and the jacket of the receptacle are, integral, as they are e.g., when the packing body is e.g., a metallic netting, or when the jacket and the packing body are made from the same wire netting or fabric.

One of the most important aspects of the apparatus according to the invention is the fact that it enables the receptacle or receptacles containing the distillation packing body or bodies to be recycled without any particular difficulty, one can normally separate the solid catalytic particles (which most frequently have dimensions smaller than those of the receptacles) from the receptacle or receptacles surrounding the packing body or bodies, for example, by coarse screening. After screening, the spent catalyst is removed, and the receptacle or receptacles of the distillation packing body or bodies are returned to the apparatus for reuse. The recycling process, which is extremely easy to carry out, offers considerable financial savings since according to the invention, only the catalyst is replaced. One can also envisage removing the spent catalyst from the reaction-distillation zone, for example, by suction or entrainment, while leaving the receptacles containing the distillation packing body or bodies in that zone, then replacing the spent catalyst thus removed with fresh catalyst.

According to the invention, the closed external jacket which forms the receptacle and which may or may not contain the packing body or bodies is permeable to fluids, that is, to liquids and gases, and impermeable to solid catalytic particles (catalyst) and to any packing body or bodies contained in the receptacle. The jacket thus prevents solid particles from entering the receptacle and the packing body or bodies rom leaving it, while allowing liquids and gases to pass through the receptacle. The packing bodies thus remain fully effective in distillation.

The jacket is normally made of a solid material, which may be a permeable, porous material, or even an impermeable material provided one with holes (or pores) therein. The holes may be small enough to keep the solid catalytic particles outside and the distillation packing body (or bodies) inside the receptacle, allowing fluids to pass therethrough.

The geometric characteristics of these holes may be stated more precisely, without this being held to restrict the invention, by taking into account the fact that the packing body or bodies normally have dimensions such that their smallest dimension is at least equal to and most frequently larger than the smallest dimension of the smallest of the solid catalytic particles. In this case, if the smallest dimension of the smallest solid catalytic particle is equal to n meters (m), then the largest dimension of the holes which let through fluids will most frequently be less than or equal to $0.9 \times n$ m and preferably less than or equal to $0.5 \times n$ m. In theory, there is no limit to the dimensions of the solid catalytic particles or grains of catalyst, and the lower limit to the largest dimension of the holes will be equal to the minimum dimension which will let through fluids and particularly liquids. In the great majority of cases, the reaction-distillation zone will contain catalysts of a particle size from $5 \times 10^{-6}$m to $2 \times 10^{-1}$m. As a non-restrictive example, in the case of an acid catalyst being used to synthesize an ether from an olefin and an alcohol, the catalyst particles are most frequently from $1 \times 10^{-4}$m to $2 \times 10^{-2}$m.

Woven or non-woven materials are examples of materials which may be used to form the jacket of the receptacle.

Such materials may be natural, e.g., of mineral, vegetable or animal origin, or synthetic. Some non-restrictive examples of such material are polypropylene, polyesters, polyamindes, aluminum, copper, titanium, nickel, platinum, stainless steel and metallic wire or other netting, the dimensions of the holes or mesh of this netting or wire being those defined hereinabove.

The material selected must be physically and chemically inert vis-à-vis the fluids and solids with which it comes into contact.

When the material chosen to form the jacket of the receptacle does not have adequate mechanical properties to produce a receptacle capable of withstanding the weight of the bulk catalyst, mechanical reinforcing elements should be included, for example, steel rods or any other means known in the art for making a receptacle with the required mechanical properties.

In the case of receptacles which are not empty, depending on the distillation packing body or bodies selected, it is preferable to choose the material for the receptacle jacket so that the combination of the two provides a packing body/receptacle jacket unit which has some rigidity; that is, the unit should have sufficient crushing resistance for a receptacle located at the bottom of a bed of solid elements not to be crushed by the weight of the bed. Thus, if the distillation packing body is rigid, the jacket may be made of a flexible, as opposed to rigid, material. Conversely, if the distillation packing body is relatively non-rigid, the jacket should preferably be made of a rigid material.

The invention provides good control of the proportion of empty space in the bed (or beds) of solid elements in the reaction-distillation zone, good control of the proportion of the zone which is filled and good control of pressure drops while the apparatus is in use. The proportion of empty space within the bed (or beds) of solid elements in the reaction-distillation zone may be fixed at a preselected value which may, for example, be obtained by selecting the number of receptacles included in the bed of solid elements. The proportion of empty space also varies according to the number of empty receptacles and the number of non-empty receptacles, and according to the method of filling the receptacles (regularly on non-regularly, partially, etc.,) and/or the type and quantity of distillation packing bodies contained in each non-empty receptacle.

In a special embodiment of the invention, a certain number of receptacles, that is, every or a certain number of receptacles, has at least one means and preferably at least tow means with the dual function of mechanically reinforcing that receptacle and keeping a minimum space between that receptacle and the closest receptacle in contact with the end of said means and/or of one of the closest solid surfaces in contact with the end of said means. Such means may be one or more rigid flanges or fins. They make it possible to adjust the proportion of empty space and the proportion filled with solid catalytic particles within the bed or beds of solid elements of the reaction-distillation zone and also provide good control of pressure drops.

The number, size and type of fins determine the proportion of empty space and the proportion filled in the reaction-distillation zone. Similarly, the fins may define and adapt the pressure drop.

The greater the size and number of fins, the more space will be available for catalyst between the receptacles containing the distillation packing body or bodies. For one and the same receptacle containing packing bodies, the higher the proportion of the column filled will consequently be, and the lower the proportion of empty space.

The fins must be very rigid. They must have crushing resistance so that they can fulfil their function of spacing the receptacle or receptacles from one another and also from the walls of the apparatus. The fins may have a plate, reinforcement or reinforcing rod, or may more simply be formed by welding or sticking the ends of the jacket together.

The size of the fin depends on the size of the receptacle. Its length (L) is most frequently from $0.01 \times p$ m to $10 \times p$ m and preferably from $0.05 \times p$ m to $1 \times p$ m, if p represents the largest dimension of the receptacle. The thickness of the fins may vary widely; it is most frequently from $1 \times 10^{-4}$ m to $5 \times 10^{-2}$ m. The number of fins is not limited. It may, for example, be from 1 to 20 and will most frequently be from 2 to 10. In an example of the production of receptacles with fins which is particularly easy to carry out, the receptacles have two fins.

The largest dimension of the receptacles will normally be less than 0.1 times and preferably less than 0.07 times the diameter of the reaction-distillation zone in the most frequent case, in which it has a substantially circular section. However, receptacles whose largest dimension may have a value greater than 0.1 times the diameter of the reaction-distillation zone and a maximum value equal to the diameter of that zone may be used without going beyond the scope of the invention.

The empty receptacles will most frequently be made of a material with adequate mechanical properties, so that the desired mechanical properties of the resultant receptacle can be obtained without having to include mechanical reinforcing means. In this case metallic materials, such as aluminum or stainless steel, will be selected, usually in the form of metallic wire or other netting. The geometric shape of the receptacles is not critical; they may be substantially tetrahedral, substantially octahedral, substantially spherical or any other shape.

In an advantageous embodiment of the invention the bed of solid elements is arranged between said perforated support and a similar fluid-permeable perforated device, the perforations of which are small enough to retain said solid elements between the support and the device. This embodiment makes it possible to reduce the mobility of the solid elements forming the bed and, to a great extent, to avoid any segregation among the solid catalytic particles and the receptacles. It is preferable for the bed of solid elements to occupy the whole volume of the reaction-distillation zone between the support and the perforated device.

The reaction-distillation apparatus according to the invention preferably has at least two reaction-distillation zones, each containing at least one bed of solid elements. These zones are not in contact with one another; that is, between successive reaction-distillation zones there are empty zones or spaces and/or zones or spaces with liquid-redistributing plates or systems and/or distillation zones (for example, comprising plates with bubble caps, plates with valves etc.) and/or zones with packing bodies, the bodies possibly being contained in receptacles.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1 is a side diagrammatical view of a reaction-distillation apparatus configured in accordance with the principles of the instant invention;

FIG. 2a is a side view of an empty receptacle configured in accordance with the principles of the instant invention and used with the apparatus of FIG. 1;

FIG. 2b is a side view of a receptacle similar to that of FIG. 2a, but having disposed therein a distillation packing body;

FIG. 2c is a cross-section taken along lines x—x' of FIG. 2a;

FIG. 2d is a cross-section taken along lines x—x' of FIG. 2b;

FIG. 3 is a perspective view, partially in phantom, showing a tubular portion of a permeable material such as a metallic fabric which is to be formed into the receptacles of FIGS. 1 and 2a–2d;

FIG. 4 is a view of the tubular member of FIG. 3 showing the bottom end closed with the top end open for receiving a distillation packing body;

FIG. 5a is a view of a receptacle with top end closed; and

FIG. 5b is a view of a receptacle, such as that of FIG. 5a, with a distillation packing body disposed therein.

DETAILED DESCRIPTION

FIG. 1 shown part of a reaction-distillation apparatus I according to the invention diagrammatically. The advantageous embodiment shown in this figure has two reaction-distillation zones (G) and (H), a zone (7) which contains a liquid-redistribution plate (8) and which separates the zones (G) and (H), and another zone (7) above the zone (H). The apparatus is in the form of a substantially cylindrical, vertical column of a diameter d which is substantially constant over the whole height of the column. Each of the reaction-distillation zones G and H has loose granular catalyst (2) and receptacles (3), on a perforated support (5) associated with a fine screen or a fabric (9) (containing smaller holes which let through the ascending flow of gas and the descending flow of liquid and retain the catalyst particles). Some of the receptacles contain one or two distillation packing bodies (4) (in the FIG. 1 embodiment). In the special case shown in FIG. 1 the non-empty receptacles contain different packing bodies and represent 12.5% of all the receptacles. The bed of solid elements including the loose solid catalytic particles (2) and receptacles (3) has a perforated plate (6) above it, the plate being fixed in the column by means not shown in FIG. 1. The solid elements are put into the column trough manholes (1), and the plate (6) (or the component required to make it) is then installed in the column so that possible movements of the solid elements and particularly of the catalyst particles are limited to the maximum. In the advantageous embodiment shown in FIG. 1 the plate (6) confines the bed of solid elements and limits subsidence of the catalyst particles. The supports (5) and plates (6) are held in position in the column by an appropriate means, e.g. by dogs (not shown in FIG. 1) or by soldering.

In the case shown diagrammatically in FIG. 1 where the perforated supports (5) are associated with a fabric (9) (or a fine screen), the fabric will be fixed to the support (5) or preferably to the wall of the apparatus by any appropriate means. In the case of a metal screen being used it may, for example, be fixed by soldering it to the walls of the apparatus. The same arrangement may be adopted for the plates (6) in cases where the holes in them are too large to retain the particles of catalyst used. In this case the fine screen or fabric (9) may preferably be fixed below the plates (6) as illustrated in FIG. 1.

FIG. 2A is a view of an empty receptacle 3. FIG. 2B is a cross-section, seen from the front, through a receptacle 3 containing a distillation packing body (4). These receptacles have two fins 10 of a length L. FIG. 2C is a cross-section, taken in a plane perpendicular to the axis yy' and passing through the axis xx', through the receptacle shown in FIG. 2A in which the fins 10 have a thickness e. FIG. 2D is similarly a cross-section, taken in a plane perpendicular to the axis yy' and passing through the axis xx', through the receptacle shown in FIG. 2B in which the fins 10 have a thickness e.

FIGS. 3, 4, 5A and 5B illustrate the stages in the production of a receptacle, which may or may not contain a distillation packing body relating to the invention. In the case shown diagrammatically in FIGS. 2B, 2D and 5B the packing body is cylindrical (e.g. a Pall or Raschig ring). The starting material for making the receptacles is a tubular portion of porous or permeable material such as metal fabric. The cross-section through the tube may be circular, oval or of any other shape, and hence the tube will be described below as "cylindrical or equivalent". This definition also includes cases where the tubular portion is not exactly cylindrical or equivalent, that is to say, where the edge of the cylinder is not of the same length at all points. This could be achieved, for example, by cutting a longer tube obliquely rather than perpendicularly when forming the tubular portion required t make the receptacle. The (mean) diameter of the tube used to make non-empty receptacles is usually at least greater than 1.1 times the diameter of the distillation packing body.

The upper and lower ends are initially open (FIG. 3). The two half-circumferences a and b, defined by their common ends A and B, are brought together until they come into contact. The two half-circumferences are fixed together, for example by welding, and then form a substantially straight flange (fin) ABB'A' (FIG. 4).

In the case of the non-empty receptacles the distillation packing body (or bodies) (FIG. 5B) are placed in the bag, the bottom of which has been closed as explained above. The bringing together and fixing operation is then repeated, this time with the half-circumferences defined by their common ends C and D or E and F or any pair of points symmetrical with the centre of the cross-section of the tube. Thus in the case of both empty and non-empty receptacles, when the half-circumferences have been fixed e.g. by welding, a substantially straight flange (fin) EE'FF' is formed (FIGS. 5A and 5B). The resultant receptacles (whether or not they contain the distillation packing body) have two fins of adaptable size. The length L of each of these fins is respectively equal to AA' or BB' and to EE' or FF'. This length depends on the width of the weld. Its thickness of about twice the thickness of the material forming the tube. The dimension of the fins along the axis substantially parallel with the axis defined by the ends AB and EF is substantially equal to the length of each half-circumference from which it was formed. In the embodiment illustrated in these figures the largest dimension p (FIGS. 5A and 5B) of the receptacle is substantially equal to the largest dimension of the packing body contained in that receptacle.

The invention also covers use of the apparatus described above for carrying out chemical reactions and fractionating the reaction mixture. In particular it concerns use of the apparatus described above for the production of ethers by reacting olefins which have 3 to 8 carbon atoms in their molecule with alcohols which have 1 to 6 carbon atoms in their molecule. Some special examples of olefins which may be used are propene, isobutene or other isomeric butenes and isoamylene or other isomeric pentenes. Some examples of alcohols which may be used are methanol, ethanol, n-propanol, isopropanol and butanols. The ethers which are most commonly manufactured industrially nowadays include methyl tertiobutyl ether (MTBE), ethyl tertiobutyl either (ETBE), isopropyl tertiobutyl ether (IPTBE), tertioamyl methyl ether (TAME) and ethyl tertioamyl ether (ETAE).

The invention also concerns the method of preparing an ether by reacting olefins which have 3 to 8 carbon atoms in their molecule with alcohols which have 1 to 6 carbon atoms in their molecule, in the presence of an acid catalyst in the form of solid particles, wherein the reaction and the distillation of the products formed during the reaction are carried out concurrently in an apparatus as described above, and wherein the ether formed is recovered continuously. The acid catalyst most frequently used to carry out the reaction is an ion exchange resin in acid form, such as a sulphonated resin (particularly a sulphonated polystyrene-divinylbenzene resin such as Amberlyst 15 produced by Rohm & Haas). It is preferable to use olefins with 4 to 6 carbon atoms in their molecule and alcohols with 1 to 4. The most frequently used olefins will be tertiary ones.

The conditions for preparing ether from at least one olefin and at least one alcohol are conventional ones well known in the art. As an indication, one will generally maintain a reflux ratio relative to the distillate (i.e. a ratio of the volume of liquid flowing back to the volume of liquid drawn off) of about 0.1:1 to about 20:1, preferably from about 0.5:1 to about 5:1. One will operate more often than not, inside of apparatus (c) in a rather wide range of temperature and of pression: for example, from 100 to 3000 kilopascals (kPa), preferably from 200 to 2000 kPa for the pressure and from 10° to 200° C., preferably from 40° to 120° C. for the temperature (in the whole apparatus). Each bed of solid elements including the solid catalytic particles occupies the whole substantially circular section of the reaction-distillation zone. The solid particles may be put into any appropriate form, particularly into a substantially cylindrical or substantially spherical form.

EXAMPLE 1

The effectiveness of the distilling action of a reaction-distillation apparatus may be characterised by determining the equivalent height in theoretical plates (EHTP). In this example the EHTPs are determined by the so-called MacCabe and Thiele method, by distilling a binary methanol-ethanol mixture with total reflux. At equilibrium, analysis (refractive index) of the distillate (sample taken at the top of the column) and residue (boiler) enables the number of theoretical plates in the column to be obtained graphically, from the graph of liquid/vapour equilibrium. The experiments are carried out in the laboratory apparatus, in the form of a column of cylindrical section with an inside diameter of 60 mm, arranged on a one-liter flask (boiler) fitted with a cooler and a reflux system. The apparatus is equipped with two temperature recorders, at the top and bottom of the column. The experiments are carried out with total reflux. At thermal equilibrium, a sample is taken from the flask (residue or drawn-off material) and a sample from the top of the column at the reflux level (distillate). The apparatus C1 is filled to a height of 600 mm with the reaction column packing described in patent specification EP-B-8860 and illustrated in FIGS. 2 and 3 thereof. The packing rests on a perforated support in which the circular holes have a diameter of 10 mm. In an apparatus C2 identical with C1 a screen, which has a square mesh with side dimensions of 0.3 mm, is fixed on the perforated support. A loose quantity of receptacles are inserted, their largest dimension being 15 mm and their jacket being made of woven polypropylene with a square mesh, the sides of which measure 0.3 mm. Each of the receptacles contains a Pall ring. The total height of the bed is 600 mm. The quantity of filling in the column, by weight of dry catalyst, is the same in each of the two experiments. The catalyst used is sulphonated resin sold by Rohm & Haas under the trade name of Amberlyst 15. An EHTP of 0.4 m is found in the case of apparatus C1 and an EHTP of 0.3 m in the case of apparatus C2. Thus the apparatus according to the invention brings a considerable gain in the effectiveness of distillation, since there is a 25% gain in the height of a theoretical plate.

EXAMPLE 2

To simulate the finishing reactor in an industrial unit, MTBE is synthesised is an experimental reaction column. It is fed with a charge containing methanol and a mixture of butenes and butanes containing about 25% of isobutene which is already 80% converted to MTBE. The first experiment (I) takes place with the apparatus C1 described in Example 1. In the second experiment (II), which illustrates the invention, the apparatus C2 described in Example 1 is used. By operating at a pressure of the order of 0.5 MPa and a temperature from 60° to 80° C., and by maintaining a reflux ratio of the order of 1:1, approximately 60% of the residual isobutene is converted to MTBE in the first experiment, as compared with approximately 83% in the second one.

Considerably better conversion is therefore obtained with the apparatus of the invention than with an apparatus designed according to the teaching of patent DP-B-8860.

We claim:

1. A reaction-distillation apparatus including at least one reaction distillation zone of a predetermined volume, the apparatus comprising:

at least one bed of solid elements of a predetermined weight, the solid elements having a predetermined diameter, the bed of solid elements being disposed on a fluid-permeable, perforated support having perforations of a diameter less than the predetermined diameter of said solid elements to retain said solid elements, said bed of solid elements on the fluid-permeable perforated support including therewith loose solid catalytic particles and a plurality of receptacles, the receptacles having external jackets permeable to fluids and impermeable to the loose solid catalytic particles, said receptacles being sufficiently rigid to withstand the weight of the loose solid catalyst particles without collapsing, and from 1 to 100% of the receptacles containing at least one distillation packing body.

2. The apparatus of claim 1, wherein at least one of the receptacles has at least one reinforcing and spacing means for mechanically reinforcing the receptacle, the reinforcing and spacing means having an end for keeping a space between at least an adjacent receptacle in contact with the end of the reinforcing and spacing means of the receptacle and an adjacent solid surface in contact with the end of the reinforcing and spacing means of the receptacle.

3. The apparatus of claim 1, wherein at least one of the receptacles has at least two reinforcing and spacing components for mechanically reinforcing the receptacle, the reinforcing and spacing components having an end for keeping a space between at least an adjacent receptacle in contact with the end and an adjacent solid surface in contact with the end of the receptacle.

4. The apparatus of claim 1, wherein the bed of solid elements is disposed between the fluid-permeable, perforated support and a similar fluid-permeable, perforated device having perforations of a diameter less than that of the solid elements to retain said solid elements between the fluid-permeable perforated support and the fluid-permeable, perforated device.

5. The apparatus of claim 4, wherein the bed of solid elements occupies a whole volume of the reaction-distillation zone between the fluid-permeable, perforated support and the fluid permeable perforated device.

6. The apparatus of claim 1, comprising a plurality of reaction-distillation zones, each containing at least one bed of solid elements, the plurality of reaction distillation zones being disposed in spaced relation with respect to one another.

7. The apparatus of claim 1, wherein from 1 to 90% of the receptacles contain at least one distillation packing body.

8. The apparatus of claim 1, wherein the receptacles are made of metallic mesh.

9. The apparatus of claim 1, further comprising boiler means and cooling means.

* * * * *